(12) United States Patent
Chang et al.

(10) Patent No.: US 8,074,112 B1
(45) Date of Patent: Dec. 6, 2011

(54) MEMORY BACKUP USED IN A RAID SYSTEM

(75) Inventors: Lihan Chang, San Jose, CA (US); Chee Hoe Chu, San Jose, CA (US); Chi-Chih Lin, San Jose, CA (US); Wei Zhou, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 240 days.

(21) Appl. No.: 12/329,128

(22) Filed: Dec. 5, 2008

Related U.S. Application Data

(60) Provisional application No. 61/017,039, filed on Dec. 27, 2007.

(51) Int. Cl.
*G06F 11/00* (2006.01)

(52) U.S. Cl. ............ 714/14; 714/5.1; 714/6.22; 714/22; 713/340

(58) Field of Classification Search ............... 714/5, 14, 714/22, 5.1, 6.22; 713/340
See application file for complete search history.

(56) References Cited

U.S. PATENT DOCUMENTS

| | | | |
|---|---|---|---|
| 6,496,939 B2 * | 12/2002 | Portman et al. | 713/340 |
| 7,003,620 B2 * | 2/2006 | Avraham et al. | 711/103 |
| 7,392,429 B2 * | 6/2008 | Frank et al. | 714/24 |
| 7,487,391 B2 * | 2/2009 | Pecone et al. | 714/14 |
| 2002/0138792 A1 * | 9/2002 | Shinichi et al. | 714/700 |
| 2004/0103238 A1 * | 5/2004 | Avraham et al. | 711/102 |
| 2006/0015683 A1 * | 1/2006 | Ashmore et al. | 711/113 |
| 2006/0139069 A1 * | 6/2006 | Frank et al. | 327/143 |
| 2007/0033433 A1 * | 2/2007 | Pecone et al. | 714/6 |
| 2008/0215808 A1 * | 9/2008 | Ashmore et al. | 711/113 |
| 2009/0119449 A1 * | 5/2009 | Nagaram Chengal | 711/103 |

* cited by examiner

*Primary Examiner* — Charles Ehne

(57) ABSTRACT

Systems, apparatuses, and methods for memory backup in a redundant array of independent disks (RAID) system are described. The methods include detecting a failure in a main power supply that supplies power to a volatile memory that is coupled to a RAID controller, switching to a temporary power supply to supply power to the volatile memory in response to detecting the main power supply failure, and transferring data from the volatile memory to a non-volatile memory coupled to the RAID controller subsequent to switching to the temporary power supply.

15 Claims, 3 Drawing Sheets

MEMORY BACKUP USED IN A RAID SYSTEM

CROSS REFERENCE TO RELATED APPLICATIONS

The present application claims priority to U.S. Patent Application No. 61/017,039, filed Dec. 27, 2007, entitled "Concept of Flash BBU," the entire specification of which is hereby incorporated by reference in its entirety for all purposes, except for those sections, if any, that are inconsistent with this specification.

TECHNICAL FIELD

Embodiments of the present invention relate to the field of memory backup, and in particular, to memory backup using a redundant array of independent disks (RAID) system.

BACKGROUND

Storage systems using redundant array of independent disks (RAID) technology are widely used these days to prevent data loss caused by disk drive failures. Note that RAID technology is also known in the art as redundant array of inexpensive drives. In a RAID system, data is arranged across multiple disk drives (or a RAID disk array) to support redundancy and/or improved access, depending on a level of the RAID system. RAID systems may be categorized into different RAID levels (e.g., RAID 1, ..., RAID 6), according to the method of data arrangement on the disk drive and the method of providing data redundancy. For example, RAID 1 allows data to be simultaneously written to two or more disk drives, resulting in duplication of data in the disk drives. Therefore, RAID 1 is also referred to as "mirroring." As another example, with RAID 5, data are stripped across three or more drives for performance, and parity bits, distributed across all the drives, are used for fault tolerance. Upon a single drive failure, any subsequent reads may be calculated from the distributed parity such that the drive failure is masked from an end user. A RAID controller may control RAID read/write operations.

RAID technology involves write operations across multiple disks. With RAID 5 and RAID 6 arrays, for example, multiple disk input/outputs are required for each write operation. For example, a single write operation of a track may result in as many as four drive operations in case of RAID 5 array and six drive operations in case of RAID 6 array. Typically, a write operation to a block of a RAID 5 volume may be dispatched as two read operations and two write operations. And each write operation of a block of a RAID 5 volume involves a change in corresponding parity bits. Such complex operations frequently require data to be buffered or cached in a memory. In standard RAID technology, volatile memories (such as a double data rate synchronous dynamic random access memory (DDR SRAM)) or other appropriate volatile memories) are widely used as the buffer or the cache. The RAID controller may also store other information (e.g., configuration information or any other appropriate information) in the volatile memory.

FIG. 1 is a block diagram of an exemplary RAID system 10. Note that the system of FIG. 1 illustrates only the relevant components. Various other components of the system, well known to those skilled in the art, have been omitted for clarity.

The system 10 of FIG. 1 includes a RAID controller 12 coupled to a RAID disk array 16 that may include a plurality of RAID disk drives 16A, ..., 16N. The system 10 of FIG. 1 also includes a server 20 coupled to the RAID controller 12. The RAID controller 12 is also coupled to a volatile memory 24. The RAID controller 12 may be coupled to each of the RAID disk array 16, server 20, and volatile memory 24 through one or more respective interfaces that are well known in the art, although not illustrated in FIG. 1. For example, the RAID controller 12 may be coupled to the volatile memory 24 through a memory interface.

In the system 10 of FIG. 1, the server 20 may write data to one or more RAID disk drives 16A, ..., 16N or may read data from one or more of the disk drives through the RAID controller 12, as well known to those skilled in the art. The RAID controller 12 may use the volatile memory 24 for buffering data, storing data, and/or may use the volatile memory 24 as a cache.

The RAID system 10, including RAID controller 12 and volatile memory 24, may be powered by a main power supply (not illustrated in FIG. 1). Since the main power supply can fail at any time, the RAID system 10 may have a battery backup unit (BBU) 34 to power the volatile memory 24 while the main power supply is down. An example of the BBU 34 is an UPS (uninterruptable power supply). As would be readily appreciated by those skilled in the art, although not illustrated, the BBU 34, along with supplying power to the volatile memory 24, may also supply power to other components in the RAID system 10 and/or other components of a computing device in which the RAID system 10 is included.

The BBU 34 may be necessary, among other things, to maintain data integrity in the volatile memory 24 in the event of main power failure. The BBU 34 may be needed to power the volatile memory 24 until the main power supply resumes. Accordingly, the BBU 34 should preferably have sufficient capacity to power the volatile memory 24 and/or other components of the computing device (in which the RAID system 10 is included) for the entire duration the main power supply fails. If the duration of the main power failure exceeds the maximum capacity of the BBU 34, data in the volatile memory 24 may be lost.

SUMMARY

In various embodiments, the present invention provides an apparatus and a method for memory backup using a RAID system. More specifically, there is provided, in accordance with various embodiments of the present invention, an apparatus comprising a RAID controller configured to control a plurality of storage devices constituting a RAID array, a volatile memory coupled to the RAID controller and configured to store data accessible by the RAID controller, a non-volatile memory coupled to the RAID controller, a main power supply configured to supply power to the volatile memory and the RAID controller, and a temporary power supply configured to supply power to the volatile memory and the RAID controller in response to a failure of the main power supply, wherein the RAID controller may be configured to detect the failure of the main power supply, and in response, transfer data from the volatile memory to the non-volatile memory. In various embodiments, the temporary power supply may be further configured to cease supplying power to the volatile memory and the RAID controller subsequent to completion of the transfer of data from the volatile memory to the non-volatile memory. In various embodiments, the non-volatile memory may be a flash memory, the volatile memory may be a random access memory, and/or the temporary power supply may an uninterrupted power supply (UPS) unit, a battery backup unit (BBU), or a supercap. The temporary power supply may be configured to not supply power to a RAID disk interface in response to the failure of the main power supply. The RAID controller may be a RAID-on-chip (ROC) controller.

There is also provided a method for memory backup using a RAID system, comprising detecting a failure in a main power supply that supplies power to a volatile memory that may be coupled to a redundant array of independent disk (RAID) controller, switching to a temporary power supply to supply power to the volatile memory in response to detecting the main power supply failure, and transferring data from the volatile memory to a non-volatile memory coupled to the RAID controller subsequent to switching to the temporary power supply. The transferring of data from the volatile memory to the non-volatile memory may further comprise transferring data from the volatile memory to the RAID controller, and transferring data from the RAID controller to the non-volatile memory. The method may also comprise supplying power to the RAID controller with the temporary power supply in response to the main power supply failure, and/or switching off the temporary power supply subsequent to completion of transferring data from the volatile memory to the non-volatile memory. Switching to the temporary power supply may comprise switching to the temporary power supply substantially instantaneously such that data stored in the volatile memory is not corrupted because of the main power supply failure. The temporary power supply may include an uninterrupted power supply (UPS) unit, a battery backup unit (BBU), or a supercap. In various embodiments, the non-volatile memory may be a flash memory, and/or the volatile memory may be a random access memory (RAM).

There is also provided a system comprising a storage medium, and a plurality of instructions stored therein, wherein the plurality of instructions may be adapted to cause one or more processors to perform a plurality of memory backup operations, the plurality of operations comprising detecting a failure in a main power supply that supplies power to a volatile memory that may be coupled to a redundant array of independent disk (RAID) controller, switching to a temporary power supply to supply power to the volatile memory in response to detecting the main power supply failure, and transferring data from the volatile memory to a non-volatile memory coupled to the RAID controller subsequent to switching to the temporary power supply. The plurality of operations may further comprise powering the RAID controller with the temporary power supply in response to the power failure, and/or switching off the temporary power supply subsequent to completion of transferring data from the volatile memory to the non-volatile memory.

Other features that are considered as characteristic for embodiments of the present invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
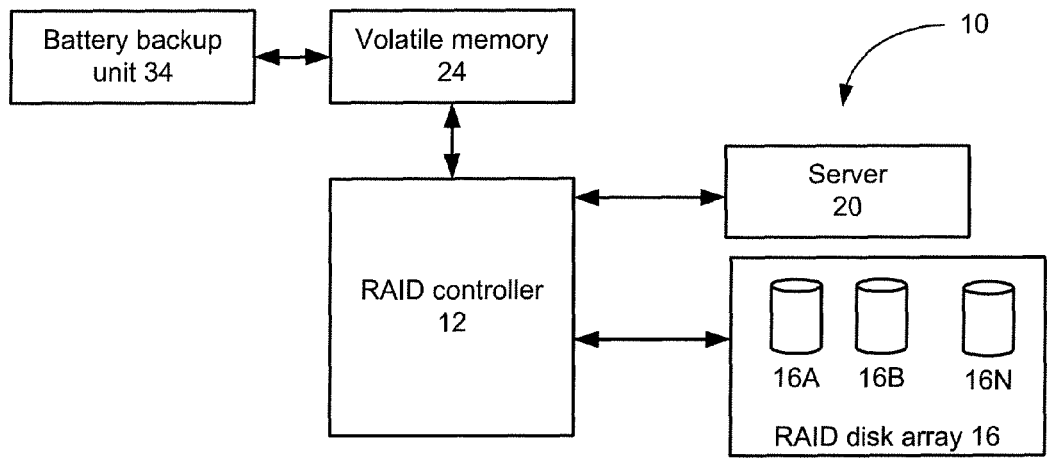
FIG. 1 is a block diagram of an exemplary RAID system.
Figure 2:
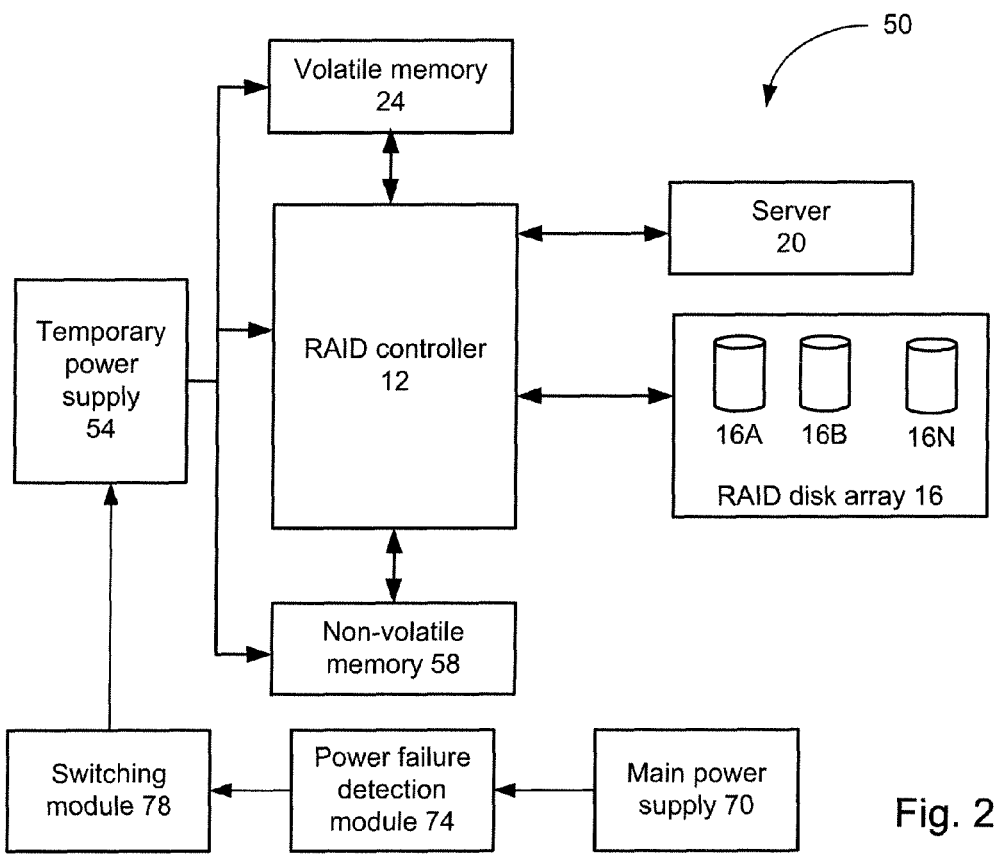
FIG. 2 is a block diagram of an exemplary RAID system, in accordance with various embodiments of the present invention.

FIG. 2 is a block diagram of an exemplary RAID system 50, in accordance with various embodiments of the present invention. The RAID system 50 includes a RAID controller 12, server 20, and RAID disk array 16, similar to the RAID system 10 of FIG. 1. In various embodiments, the RAID controller 12 may be included in a single chip and in that case, may be referred to as a RAID-on-chip (ROC) controller. In various embodiments, the volatile memory 24 may be used exclusively by the RAID system 50. Alternatively, in various embodiments, volatile memory 24 may be a general purpose system memory and the RAID system 50 may share the volatile memory 24 with other processes of the computing device in which the RAID system 50 is included.

The RAID system 50 may also include a temporary power supply 54 and a non-volatile memory 58. The non-volatile memory 58 may be, for example, an appropriate type of read only memory (ROM), a flash memory, a non-volatile random access memory (NVRAM), etc., and may be coupled to the RAID controller 12 through an appropriate memory interface (not illustrated).

Under general working conditions, various components of the RAID system 50 may be powered by a main power supply 70, similar to the RAID system 10 of FIG. 1. In various embodiments, the temporary power supply 54 may power the volatile memory 24, RAID controller 12 and non-volatile memory 58 when the main power supply 70 fails for any reason. The temporary power supply 54 may be a battery backup unit (BBU), an uninterrupted power supply (UPS), or any other appropriate type of power source (e.g., a supercap that may utilize power stored in a capacitor for supplying temporary power) that may provide temporary power during a failure of the main power supply. It should be readily apparent to those skilled in the art that, in various embodiments, the temporary power supply 54 may be used in conjunction with any other backup power unit to supply power to the system 50 in the event of main power supply failure.

In various embodiments, the RAID system 50 may also include a power failure detection module 74 and a switching module 78. The power failure detection module 74 may monitor the main power supply 70 and detect any failure in the main power supply 70. In various embodiments, the switching module 78 may switch the supplied power from the main power supply 70 to the temporary power supply 54, in response to detecting any failure in the main power supply 70 by the power failure detection module 74. The detection of failure of the main power supply 70 and switching to the temporary power supply 54 may be substantially instantaneous, such that data in the volatile memory 24 is not corrupted because of interruption in the power supply. Detecting a failure in the main power supply 70 and switching over to the temporary power supply 54 are well known to those skilled in the art, and hence, a more detailed discussion is omitted.

Figure 3:
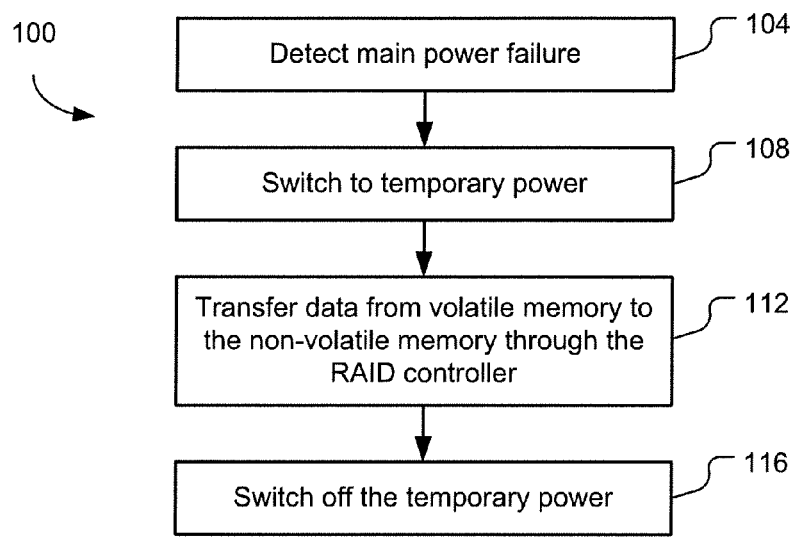
FIG. 3 illustrates an exemplary method of memory backup in the RAID system of FIG. 2, in accordance with various embodiments of the present invention.

FIG. 3 illustrates an exemplary method 100 of memory backup in the RAID system 50 of FIG. 2, in accordance with various embodiments of the present invention. The operation of the RAID system 50 of FIG. 2 will be explained with respect to the method 100 of FIG. 3. At 104, the power failure detection module 74 may detect a failure in the main power supply 70. At 108, the switching module 78 may switch to the temporary power supply 54 in response to detecting the power failure. The power failure detection module 74 may also transmit the power failure detection information to the RAID controller 12. At 112, in response to detection of the power failure and switching to the temporary power, the RAID controller 12 may initiate a data transfer from the volatile memory 24 to the non-volatile memory 58. In various embodiments, the data may be transferred at 116 from the volatile memory 24 to the non-volatile memory 58 through the RAID controller 12. Once the data transfer is complete, in various embodiments, the temporary power supply 54 may be switched off at 116.

In various embodiments, the transfer of data from the volatile memory 24 to the non-volatile memory 58 may be completed in very short time (e.g., within about one minute, half a minute, or less), and after data transfer is complete, the temporary power supply 54 may be switched off (even if the main power supply is not resumed). Thus, the temporary power supply 54 may be needed to supply power for a duration substantially shorter than the previously discussed BBU 34 of FIG. 1 (which may be needed to supply power for the entire duration during which the main power supply fails). Thus, the temporary power supply 54 of FIG. 2 may be of substantial smaller capacity than the BBU 34, resulting in a smaller size and lighter weight of the temporary power supply 54 compared to the BBU 34. Power consumed by the non-volatile memory 58 (e.g., a flash memory) during the previously discussed data transfer may not be very high. Also, as the RAID controller 12 may already be coupled to the volatile memory 24, the inventive principles discussed herein may be easily adapted using the RAID controller 12, without any significant change to the configuration of the system (e.g., without needing any type of dedicated hardware for transferring data from the volatile memory 24 to the non-volatile memory 58). That is, data may be transferred from the volatile memory 24 to the non-volatile memory 58 in the event of power failure using RAID controller 12, without needing any additional controller for such data transfer.

In various embodiments, to limit volume and weight, the temporary power supply 54 may be configured to supply power only to some selected components of the RAID system 50. For example, the temporary power supply 54 may be configured to supply power only to those components (e.g., volatile memory 24, RAID controller 12, non-volatile memory 58, etc., as illustrated) that are used to transfer data from the volatile memory 24 to the non-volatile memory 58. For example, in various embodiments, the temporary power supply 54 may be configured to not supply power to the RAID disk array 16, or any interface between the RAID controller 12 and the RAID disk array 16, as these components may not be used for transferring data from the volatile memory 24 to the non-volatile memory 58. Similarly, in various embodiments, the temporary power supply 54 may be configured to supply power only to those components (not illustrated) inside the RAID controller 12 that are used for the previously discussed data transfer.

Figure 4:
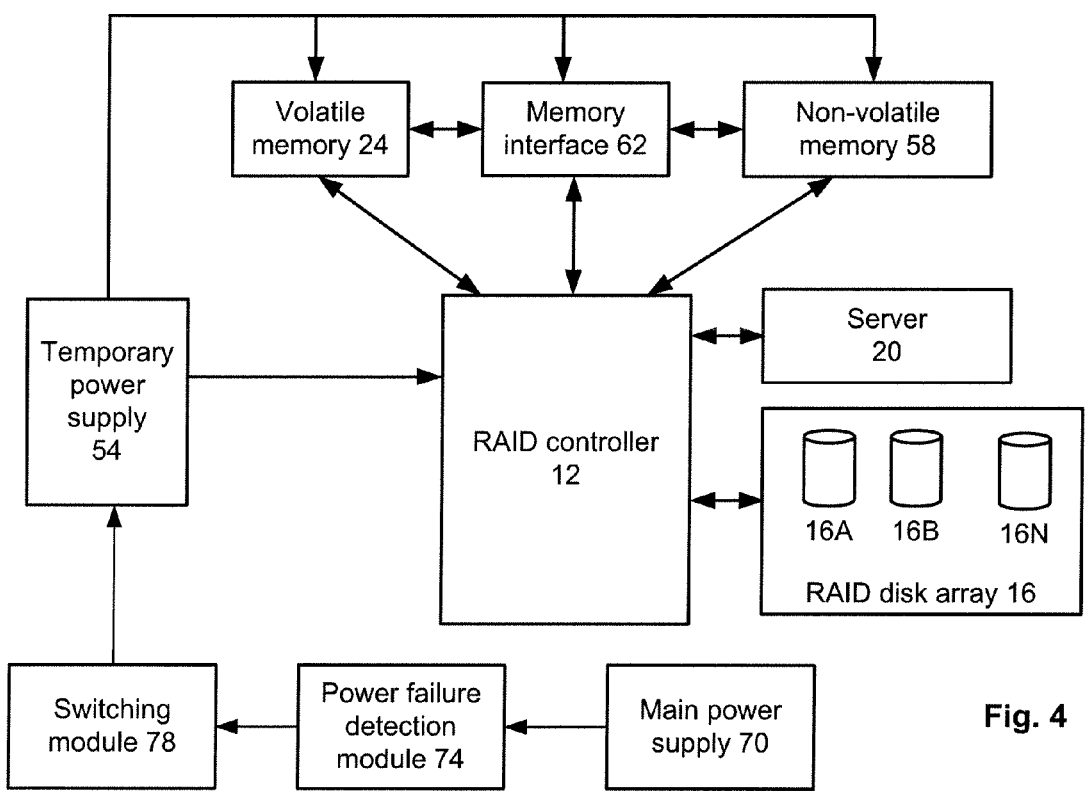
FIG. 4 is a block diagram of another exemplary RAID system, in accordance with various embodiments of the present invention.

Although FIG. 2 illustrates transfer of data from the volatile memory 24 to the non-volatile memory 58 through the RAID controller 12, in various embodiments, data need not physically pass through the RAID controller 12. For example, as illustrated in the exemplary embodiment of FIG. 4, the previously discussed data transfer may be performed through a memory interface 62, wherein the RAID controller 12 may monitor and control the data transfer process.

Figure 5:
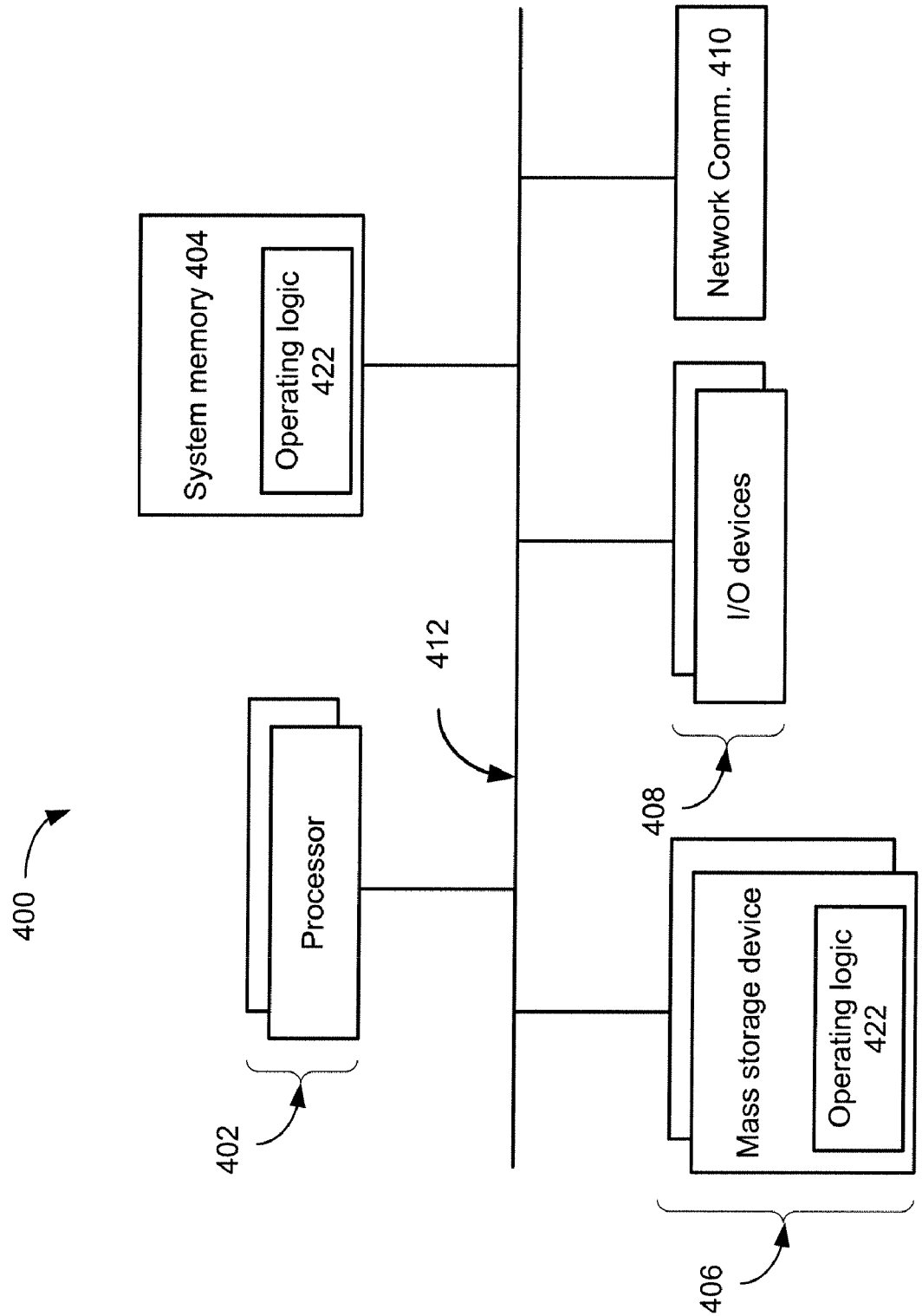
FIG. 5 is a block diagram of an exemplary system suitable for use to practice the present invention, in accordance with various embodiments.

FIG. 5 is a block diagram of an exemplary system suitable for use to practice the present invention, in accordance with various embodiments. As illustrated, system 400 includes one or more processors or processor cores 402, and system memory 404. In various embodiments, the volatile memory 24 of FIG. 2 may be the system memory 404, or may at least be a part of the system memory 404. For the purpose of this application, including the claims, the terms "processor" and "processor cores" may be considered synonymous, unless the context clearly requires otherwise. Additionally, system 400 includes mass storage devices 406 (such as diskette, hard drive, compact disc read only memory (CDROM) and so forth), input/output devices 408 (such as a display to render visual manifestation 100, a keyboard, a cursor control, and so forth) and communication interfaces 410 (such as network interface cards, modems and so forth). In various embodiments, the mass storage devices 406 may be coupled to a RAID controller 12 of FIG. 2 or 4 (not illustrated in FIG. 5), which may control the read and write operations of mass storage device 406. The elements of FIG. 5 may be coupled to each other via system bus 412, which represents one or more buses. In the case of multiple buses, they may be bridged by one or more bus bridges (not illustrated). In addition, although not illustrated, the system 400 may include a temporary power supply and a non-volatile memory, similar to those in FIG. 2 or 4.

Each of these elements performs its conventional functions known in the art. In particular, system memory 404 and mass storage 406 may be employed to store a working copy and a permanent copy of the programming instructions implementing all or a portion of earlier described functions, herein collectively denoted as 422. The instructions 422 may be assembler instructions supported by processor(s) 402 or instructions that can be compiled from high level languages, such as C.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having instructions 422 may be employed to distribute the instructions 422 and program various computing devices. The constitution of these elements 402-412 are generally well known, and accordingly will not be further described.

In embodiments of the present invention, an article of manufacture (not illustrated) may be employed to implement one or more methods as disclosed herein. For example, in exemplary embodiments, an article of manufacture may comprise a storage medium and a plurality of programming instructions stored in the storage medium and adapted to program computing device to configure the computing device to enable detecting a failure in a main power supplied to a volatile memory that is coupled to a RAID controller, switching to a temporary power supply to supply power to the volatile memory in response to detecting the power failure, and transferring data from the volatile memory to a non-volatile memory coupled to the RAID controller subsequent to switching to the temporary power supply.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. An apparatus comprising:
   a redundant array of independent disk (RAID) controller configured to control a plurality of storage devices constituting a RAID disk array;
   a volatile memory coupled to the RAID controller, the volatile memory configured to store data accessible by the RAID controller;
   a non-volatile memory coupled to the RAID controller;
   a memory interface configured to interface between the volatile memory and the non-volatile memory;
   a main power supply configured to supply power to the volatile memory and the RAID controller; and
   a temporary power supply configured to, in response to a failure of the main power supply, supply power to the volatile memory and the RAID controller;
   wherein the RAID controller is further configured to detect the failure of the main power supply, and
      in response to having detected the failure of the main power supply, transfer data from the volatile memory to the non-volatile memory; and
   wherein the temporary power supply is further configured to cease supplying power to the volatile memory and the RAID controller subsequent to, and in response to, completion of the transfer of data from the volatile memory to the non-volatile memory,
   wherein the data is transferred, in response to detecting the failure of the main power supply, from the volatile memory to the non-volatile memory through the memory interface, by bypassing the RAID controller.

2. The apparatus of claim 1, wherein the non-volatile memory is a flash memory.

3. The apparatus of claim 1, wherein the volatile memory is a random access memory.

4. The apparatus of claim 1, wherein the temporary power supply is an uninterrupted power supply (UPS) unit, a battery backup unit (BBU), or a supercap.

5. The apparatus of claim 1, wherein the temporary power supply is configured to not supply power to a RAID disk interface in response to the failure of the main power supply.

6. The apparatus of claim 1, wherein the RAID controller is a RAID-on-chip (ROC) controller.

7. A method comprising:
   detecting a failure in a main power supply that supplies power to a volatile memory, wherein the volatile memory is coupled to a redundant array of independent disk (RAID) controller;
   in response to detecting the failure of the main power supply, switching to a temporary power supply to supply power to the volatile memory
   subsequent to switching to the temporary power supply, transferring data from the volatile memory to a non-volatile memory coupled to the RAID controller, wherein said transferring data from the volatile memory to the non-volatile memory is performed through a memory interface, by bypassing the RAID controller, wherein the memory interface is configured to act as an interface between the volatile memory and the non-volatile memory; and
   switching off the temporary power supply subsequent to, and in response to, completion of the transfer of the data from the volatile memory to the non-volatile memory.

8. The method of claim 7, wherein transferring data from the volatile memory to the non-volatile memory further comprises:
   transferring data from the volatile memory to the RAID controller; and
   transferring data from the RAID controller to the non-volatile memory.

9. The method of claim 7, further comprising:
   supplying power to the RAID controller with the temporary power supply in response to the failure of the main power supply.

10. The method of claim 7, wherein switching to the temporary power supply comprises:
    switching to the temporary power supply substantially instantaneously such that the data stored in the volatile memory is not corrupted due to the failure of the main power supply.

11. The method of claim 7, wherein the temporary power supply includes an uninterrupted power supply (UPS) unit, a battery backup unit (BBU), or a supercap.

12. The method of claim 7, wherein the non-volatile memory is a flash memory.

13. The method of claim 7, wherein the volatile memory is a random access memory (RAM).

14. A system comprising:
    a storage medium; and
    a plurality of instructions tangibly stored on the storage medium;
    wherein the plurality of instructions are configured to cause one or more processors to perform a plurality of memory backup operations, the plurality of memory backup operations comprising:
       detecting a failure in a main power supply that supplies power to a volatile memory, wherein the volatile memory is coupled to a redundant array of independent disk (RAID) controller;

in response to detecting the failure of the main power supply, switching to a temporary power supply to supply power to the volatile memory subsequent to switching to the temporary power supply, transferring data from the volatile memory to a non-volatile memory coupled to the RAID controller, wherein said transferring data from the volatile memory to the non-volatile memory is performed through a memory interface, by bypassing the RAID controller, wherein the memory interface is configured to act as an interface between the volatile memory and the non-volatile memory; and switching off the temporary power supply subsequent to, and in response to, completion of the transfer of the data from the volatile memory to the non-volatile memory.

15. The system of claim 14, the plurality of memory backup operations further comprise:

in response to the failure of the main power supply, powering the RAID controller with the temporary power supply.

* * * * *